United States Patent [19]

Kaba

[11] Patent Number: 5,568,600
[45] Date of Patent: Oct. 22, 1996

[54] METHOD AND APPARATUS FOR ROTATING AND SCALING IMAGES

[75] Inventor: James T. C. Kaba, Jackson, N.J.

[73] Assignee: David Sarnoff Research Ctr., Princeton, N.J.

[21] Appl. No.: 228,539

[22] Filed: Apr. 15, 1994

[51] Int. Cl.$^6$ .................................................. G06T 3/00
[52] U.S. Cl. .......................... 395/137; 395/133; 395/139
[58] Field of Search .................................. 395/133–139,
395/141, 119, 109, 164, 127; 382/44–47;
345/121, 126, 127

[56] References Cited

U.S. PATENT DOCUMENTS

| | | | |
|---|---|---|---|
| 4,283,765 | 8/1981 | Rieger | 395/127 |
| 4,759,076 | 7/1988 | Tanaka et al. | 382/46 |
| 4,805,117 | 2/1989 | Fiore et al. | 395/133 |
| 4,829,452 | 5/1989 | Kang et al. | 395/137 |
| 4,908,874 | 3/1990 | Gabriel | 382/41 |
| 5,050,225 | 9/1991 | Itoh | 382/46 |
| 5,204,944 | 4/1993 | Wolberg et al. | 395/119 X |
| 5,263,136 | 11/1993 | DeAguiar et al. | 395/164 |
| 5,303,334 | 4/1994 | Snyder et al. | 395/109 |

OTHER PUBLICATIONS

Wolberg, Digital Image Warping, Computer Society Press, pp. 41–51, 187–189, 204–209 (1990).

E. Catmull, "3–D Transformations of Images in Scanline Order", Association of Computing Machinery (ACM): Proceddings of Siggraph '80, pp. 279–285 (1980).

C. F. R. Weiman, "Continuous Anti–Aliasing Rotation and Zoom of Raster Images", Association of Computing Machinery (ACM): Proceddings of Siggraph '80, pp. 286–293 (1980).

C. Braccini et al., "Fast Geometric Manipulations of Digital Images", Computer Graphics and Image Processing, No. 13, pp. 127–141 (1980).

*Primary Examiner*—Almis R. Jankus
*Attorney, Agent, or Firm*—William J. Burke

[57] ABSTRACT

A method and apparatus, within a computer system, for rotating and scaling an image using a three step process. The amount of image rotation and scaling is user defined. The three step process precisely rotates an input image to rapidly produce an output image. Specifically, the three step process shears each pixel location in the input image along a first axis, then shears and scales the sheared pixel locations along a second axis, and lastly, the sheared and scaled pixel locations are scaled along the first axis to produce an output image that is precisely rotated and scaled relative the input image. The apparatus and method disclosed find applicability in video servers, medical imaging, special effects and animation and location based entertainment systems among other applications.

21 Claims, 4 Drawing Sheets

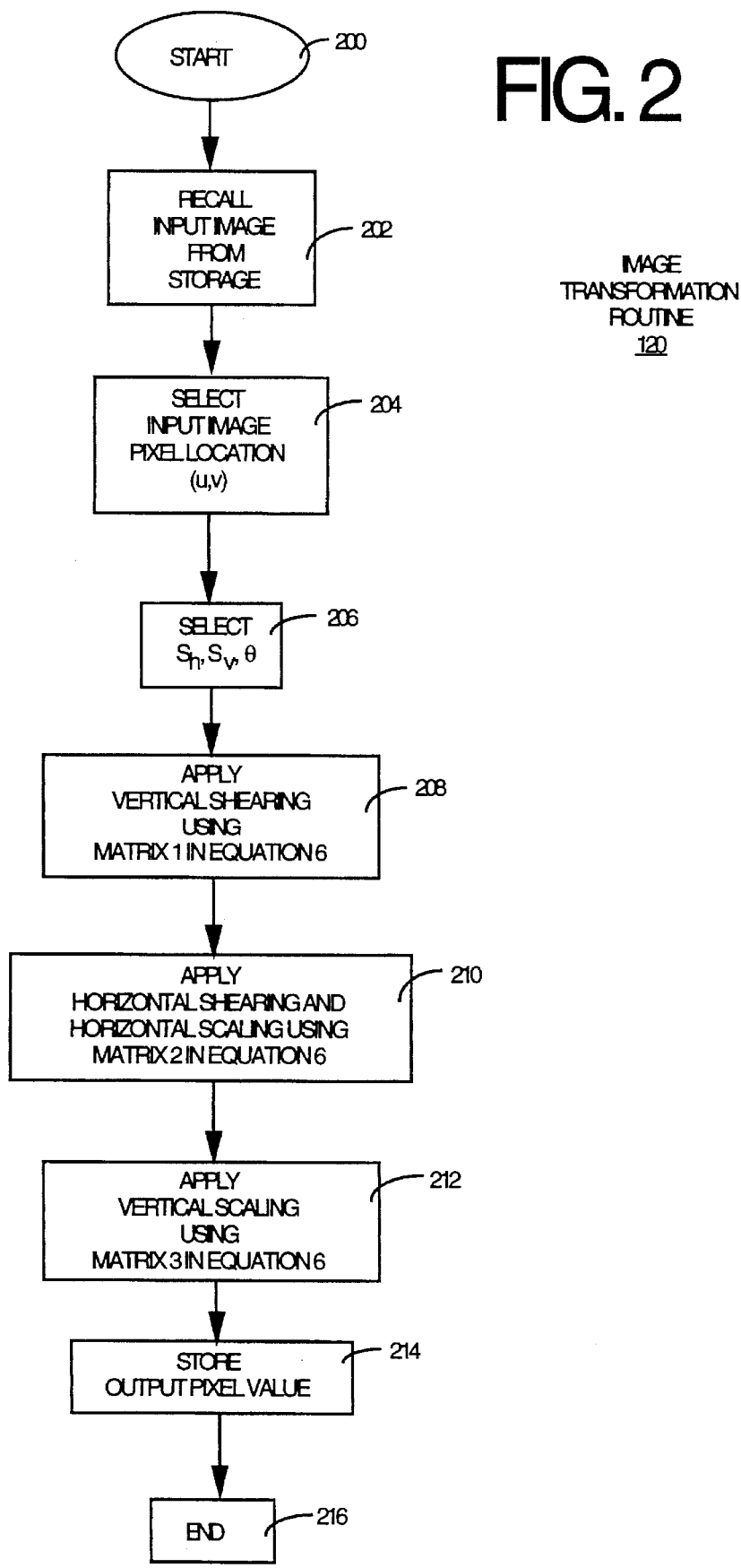

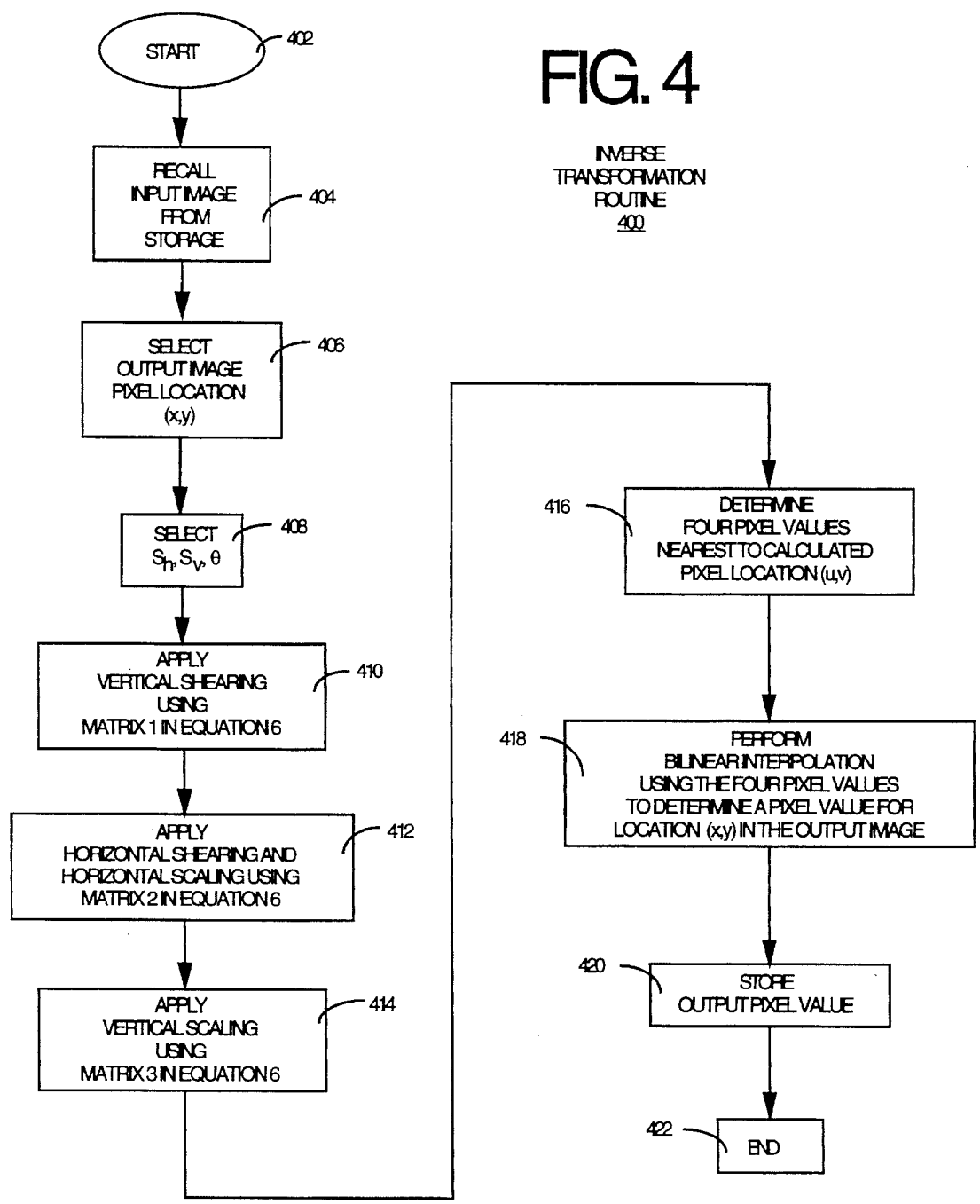

METHOD AND APPARATUS FOR ROTATING AND SCALING IMAGES

BACKGROUND OF THE DISCLOSURE

The invention relates to computer image and computer graphics processing systems and, more particularly, to methods and apparatus for manipulating images within an image or graphics processing system.

Generally, digitized images contain rows of pixels that, when taken together, form an image upon a computer screen or can be printed by a computer printer. Each pixel is typically defined by a value and a location. The pixel value, commonly a 24-bit word, defines a pixel intensity and a pixel color. The pixel location is defined by a coordinate within a Cartesian coordinate system. To display an image comprised of an array of such pixels, a computer system generates a display by displaying each pixel in a raster scan pattern.

Such digitized images can be created from "hardcopy" images by conventional scanner hardware. Alternatively, digitized images can be directly created by a computer graphics (drawing) program, a "frame grabber" and the like. Once the image is created and stored within a computer system, a user can manipulate the image by, for example, rotating, scaling, magnifying, and perspective warping. Such manipulations are generally known in the art as image transformations.

To facilitate most image transformations, the coordinate system of an original image is transformed into a coordinate system for a transformed image. Consequently, a transformation can be represented as a matrix function. Equation 1 depicts the general form of a matrix function for implementing conventional transformations.

$$(x, y) = (u, v) \begin{vmatrix} a & b \\ c & d \end{vmatrix} \quad (1)$$

where:

(u,v) defines a location of a pixel in the coordinate system for the original image (digitized input image);

(x,y) defines a location of a pixel in the coordinate system for the transformed image (output image); and a, b, c, d define the transformation function.

For example, Table 1 shows illustrative matrix variables to perform certain transformations.

TABLE 1

Illustrative Transformation Values

| TRANSFORMATION | a | b | c | d |
|---|---|---|---|---|
| Scaling | $S_h$ | 0 | $S_v$ | 0 |
| Skewing | 1 | 0 | 1 | $H_h$ |
| Counterclockwise Rotation | $\cos\theta$ | $\sin\theta$ | $-\sin\theta$ | $\cos\theta$ |

$S_h$ and $S_v$ respectively are horizontal and vertical scale factors, $H_h$ is a shear factor, and $\theta$ is a rotation angle. Using these matrix variables, or a combination thereof, a given pixel within an image can be scaled, skewed, or rotated from its original location in the input image. By repeatedly applying such matrices to each pixel in an input image, an entire image can be transformed.

To simplify the computation in performing a transformation, the two-dimensional transformations can often be represented as a cascade of one-dimensional transformations. For example, to perform a scaling transformation, each dimension of the image can be scaled independently. Equation 2 depicts such a transformation.

$$(x, y) = (u, v) \begin{vmatrix} S_h & 0 \\ 0 & 1 \end{vmatrix} \cdot \begin{vmatrix} 1 & 0 \\ 0 & S_v \end{vmatrix} \quad (2)$$

Furthermore, there have been numerous methods proposed by those skilled in the art for performing multi-step rotation transformation, e.g., 2-, 3-, and 4-step rotation transformations. In each multi-step rotation transformation, the goal is to perform the transformation mathematics in an efficient process, i.e., simplifying the matrix calculation. Typically, this means performing triangular decomposition upon the transformation matrix. As such, the general form of, for example, a rotation matrix is decomposed into a cascade of upper and lower triangular matrices. For example, Equation 3 is a 2-step rotation transformation containing an upper and a lower triangular matrix.

$$(x, y) = (u, v) \begin{vmatrix} \cos\theta & 0 \\ -\sin\theta & 1 \end{vmatrix} \cdot \begin{vmatrix} 1 & (\tan\theta) \\ 0 & \frac{1}{\cos\theta} \end{vmatrix} \quad (3)$$

The first matrix (left) in Equation 3 performs a horizontal shear combined with a horizontal scale, while the second matrix (right) performs a vertical shear and a vertical scale. After applying both matrixes to coordinates (u,v), the output coordinates (x,y) are rotated relative to the (u,v) coordinates.

Equation 4 is an illustrative 3-step rotation transformation containing two upper triangular matrices and a lower triangular matrix.

$$(x, y) = (u, v) \begin{vmatrix} 1 & 0 \\ -\tan\frac{\theta}{2} & 1 \end{vmatrix} \cdot \begin{vmatrix} 1 & \sin\theta \\ 0 & 1 \end{vmatrix} \cdot \begin{vmatrix} 1 & 0 \\ -\tan\frac{\theta}{2} & 1 \end{vmatrix} \quad (4)$$

In Equation 4, the first and third matrices perform horizontal shear functions, while the second matrix performs a vertical shear function. The result of applying this cascade of matrices to a pixel location is a rotation of that location.

Equation 5 is an illustrative 4-step rotation transformation containing an upper triangular matrix and three lower triangular matrices.

$$(x, y) = (u, v) \begin{vmatrix} 1 & \tan\theta \\ 0 & 1 \end{vmatrix} \cdot \begin{vmatrix} 1 & 0 \\ -\sin\theta\cos\theta & 1 \end{vmatrix} \cdot \quad (5)$$

$$\begin{vmatrix} 1 & 0 \\ 0 & \cos\theta \end{vmatrix} \cdot \begin{vmatrix} \frac{1}{\cos\theta} & 0 \\ 0 & 1 \end{vmatrix}$$

In Equation 5 (applying the matrices from left to right to coordinates (u,v)), the first matrix performs a vertical shear function, the second matrix performs a horizontal shear function, the third matrix performs a vertical scale function, and the fourth matrix performs a horizontal scale function. In combination, this cascade of matrices rotates the pixel location.

Such transformation matrices as those shown above have been disclosed in: E. Catmull et al., "3-D Transformations of Images in Scanline Order", Association for Computing Machinery (ACM): Proceedings of Siggraph '80, pp. 279–285 (1980); C.F.R. Weiman, "Continuous Anti-Aliasing Rotation and Zoom of Raster Images", Association for Computing Machinery (ACM): Proceedings of Siggraph '80, pp. 286–293 (1980); C. Braccini et al., "Fast Geometrical Manipulations of Digital Images", Computer Graphics and Image Processing, No. 13, pp. 127–141 (1980); and Tanaka et al., U.S. Pat. No. 4,759,076, issued Jul. 19, 1988.

If a scaling function as well as a rotation function is desired, an image processing system would typically have to solve six matrix multiplications, e.g., four from Equation 5 and two from Equation 2. Thus, a combination scaling and rotating function requires an excessive amount of computations to perform. This is especially time consuming when a high resolution image is being transformed, i.e., each pixel in the millions of pixels comprising the image must be transformed.

Therefore, a need exists in the art for a method and apparatus for efficiently scaling and rotating images using less computational steps than presently are used in the prior art.

SUMMARY OF THE INVENTION

The invention advantageously overcomes the disadvantages heretofore associated with the prior art. In particular, the invention is a method and apparatus for scaling and rotating an input image using a three-step process. Specifically, the three step process shears the input image along a first axis to produce a sheared image, then shears and scales the sheared image along a second axis to produce a scaled image, and, finally, scales the scaled image along the first axis to produce a rotated and scaled image as an output image. Such a three step process rapidly and precisely rotates and scales the input image.

BRIEF DESCRIPTION OF THE DRAWINGS

FIG. 2 depicts a flow chart of the present invention as executed on the computer system FIG. 1;

FIG. 4 depicts a flow chart of a inverse transformation routine as executed on the computer system of FIG. 1

To facilitate understanding, identical reference numerals have been used, where possible, to designate identical elements that are common to the figures.

DETAILED DESCRIPTION

Figure 1:
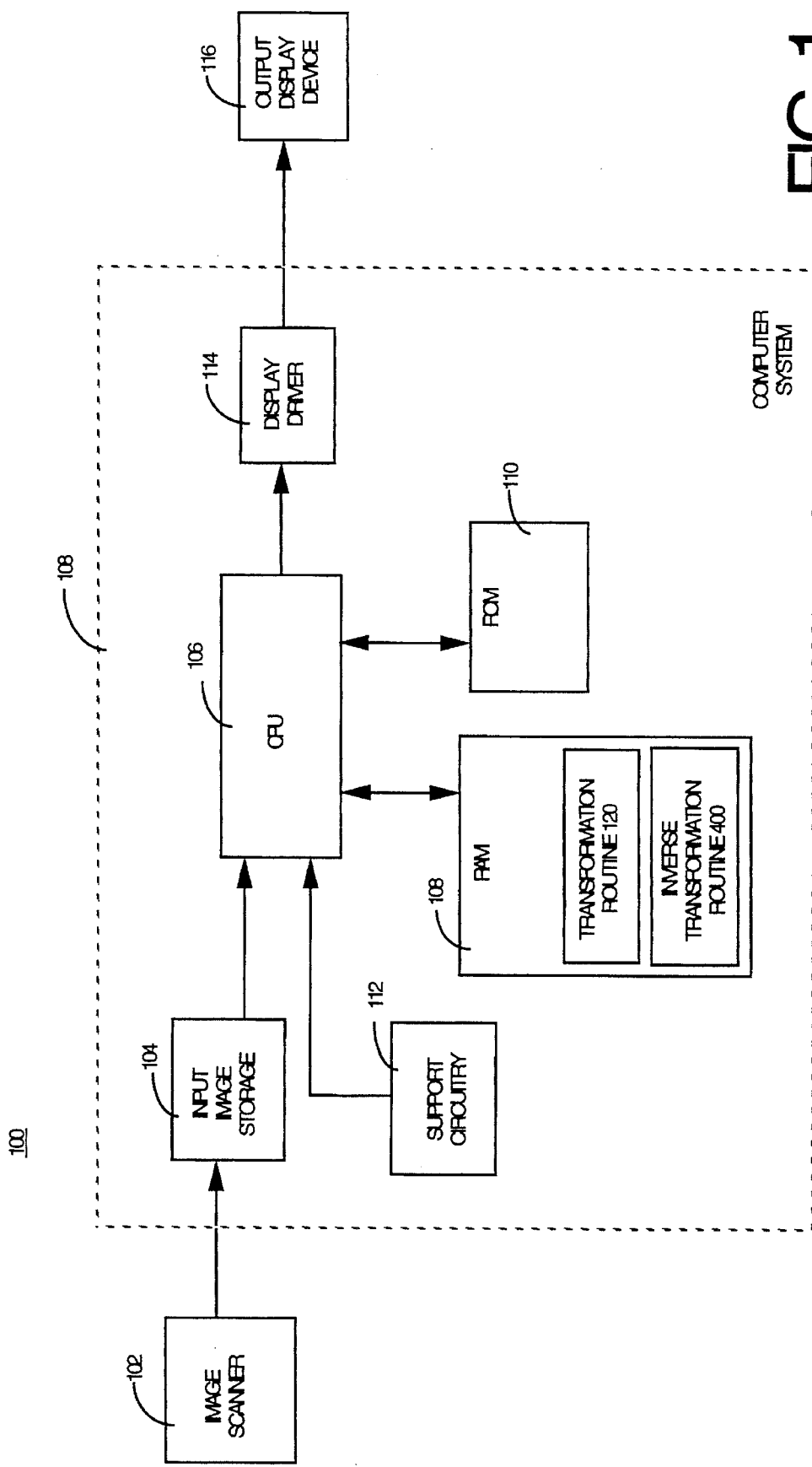
FIG. 1 depicts a block diagram of a computer system for implementing the present invention.

FIG. 1 depicts a block diagram of an image processing system 100 that utilizes the present invention. The image processing system 100 contains an image generation device such as a computer graphics system, image scanner, frame grabber, and the like. For the following discussion, this device is assumed to be an image scanner 102 which generates a bitmap image (input image) containing a plurality of pixel values that are arranged in uniform rows. Cumulatively, the rows of pixel values form the input image to an image transformation apparatus 118. The image transformation apparatus 118 transforms, e.g., scales and rotates, the location(s) of one or more of the pixel values in the input image. The resultant image is displayed upon the output image display device 116, e.g., a computer screen or image printer.

The image transformation apparatus 118 can be implemented using a personal computer, computer workstation, or other computer system. As such, as an alternative to the scanner for input image generation, the input image can be created using graphics software executing on the apparatus 118. Consequently, the input image would be a computer file of data defining the input image.

The input image, whether created by the scanner 102 or graphics software, is temporarily stored in input image storage 104. The input image storage 104 can be a hard disk drive or integrated circuit random access memory. This storage is accessed by central processing unit (CPU) 106 and the CPU performs image transformations upon the recalled image.

The CPU 106 is a conventional microprocessor supported by standard hardware such as random access memory (RAM) 108, read only memory (ROM) 110, and general support circuitry 112, e.g., a power supply, a clock, and other such circuitry all of which is not specifically shown. The CPU 106 performs an image transformation upon the pixels located within the input image. A display driver 114 formats the output image, i.e., the transformed input image, into a display format that the output image display device 116 can utilize.

Specifically, to perform an image transformation, the CPU 106 executes a transformation routine 120 stored in RAM 108. This program causes the CPU to recall an input image, or a portion of an input image. The transformation program applies its transform upon the pixel locations within the image to produce an output image. More specifically, the transformation program both rotates and scales the locations of pixels within the input image to new locations within the output image.

More specifically, the transformation routine both rotates and scales a pixel location using a three-step process. Equation 6 mathematically represents this three-step process as a cascade of three matrices.

$$(x, y) = (u, v) \begin{vmatrix} 1 & \tan\theta \\ 0 & 1 \end{vmatrix} \cdot \begin{vmatrix} \frac{S_h}{\cos\theta} & 0 \\ -S_h \sin\theta & 1 \end{vmatrix} \cdot \begin{vmatrix} 1 & 0 \\ 0 & S_v \cos\theta \end{vmatrix} \quad (6)$$

MATRIX 1      MATRIX 2      MATRIX 3 where:

θ is an angle of image rotation;

$S_h$ is a horizontal scale factor; and $S_v$ is a vertical scale factor.

FIG. 2 depicts a flow chart of the transformation routine 120. Routine 120 is entered upon execution at step 200, generally labeled "START". Thereafter, at step 202, an input image, or a portion thereof, is recalled from memory. At step 204, a pixel coordinate (u,v) to be scaled and rotated is selected from the image. At step 206, a user selects the parameters $S_h$, $S_v$, and θ defining the degree of scaling and rotating to be accomplished. At step 208, the input image pixel coordinates are multiplied by a matrix (MATRIX 1 in Equation 6) that applies a vertical shearing function to the coordinates. Next, at step 210, the vertically sheared pixel coordinates are multiplied by a second matrix (MATRIX 2 in Equation 6) to horizontally shear and horizontally scale the location. Lastly, at step 212, the pixel coordinates resulting from step 210 are multiplied by a third matrix (MATRIX 3 in Equation 6) to vertically scale the pixel coordinates. The transformation routine ends at step 214.

As a result of this routine operating upon coordinates (u,v) in the input image, those coordinates are scaled and rotated a predefined amount to location (x,y) in the output image. If routine 120 is repeatedly executed to operate upon all the pixels in an input image, then the entire image becomes scaled and rotated. Typically, the pixels in the input image are operated upon in raster scan order.

Figure 3A:
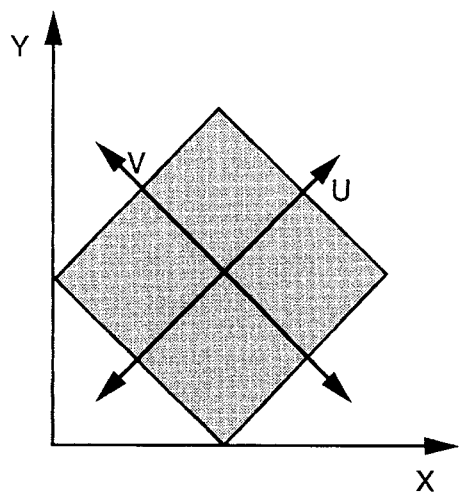
FIGS. 3A–3D depict, in a pictorial manner, the operation of the present invention upon an image defined by a Cartesian coordinate system.
Figure 3B:
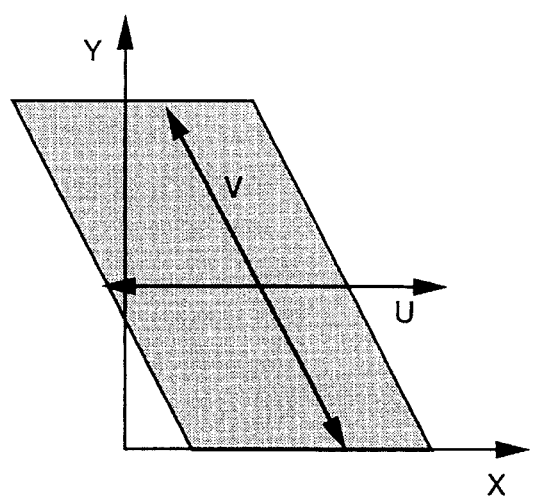
Figure 3C:
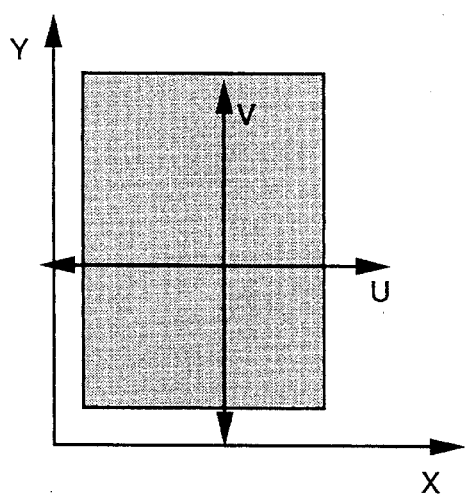
Figure 3D:
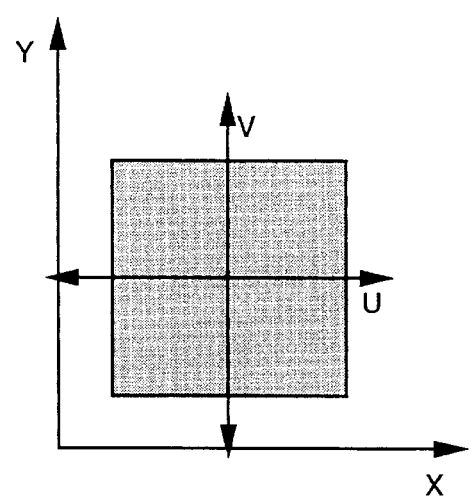

FIGS. 3A–3D depicts the scaling and rotating transformation in a pictorial manner. FIG. 3A depicts an input image (shaded area) having an input image coordinate system (U,V) overlaid on an output image coordinate system (X,Y). FIG. 3B depicts a vertical shear operation of MATRIX i in Equation 6 (step 208 in FIG. 2) as the shearing operation aligns the U-axis with the X-axis. In FIG. 3C, MATRIX 2 in Equation 6 (step 210 in FIG. 2) shears the image to align the V-axis with the Y-axis and horizontally scales the image by the predefined scale factor. Lastly, in FIG. 3D, MATRIX 3 (step 212 in FIG. 2) vertically scales the image by the predefined scaling factor. Consequently, the transformation routine scales and rotates the input image to form an output image using only a three-step process. Thus, this inventive apparatus and method significantly reduces the computations required to perform a scale and rotate transformation of an image. The result is a significant reduction in computing time over that spent by the prior in accomplishing the same scale and rotate transformation.

The foregoing discussion rotated and scaled the input image by executing a vertical function, a horizontal function, and then a vertical function; however, in the alternative, the process can also be accomplished by executing a horizontal function, a vertical function and then a horizontal function. To generalize, the invention first shears the input image along a first axis to produce a sheared image, then shears and scales the sheared image along a second axis to produce a scaled image, and, lastly, the scaled image is scaled along the first axis to produce an output image. The output image is a scaled and rotated version of the input image. In this general description, the first and second axes are orthogonal axes within a two-dimensional plane.

In certain applications for image processing systems, it is significantly more efficient to map a desired output pixel location onto an input pixel location. Such transformations are known in the art as inverse transformations. Using an inverse transformation a given pixel location in the output image is mapped onto a location in the input image. This location may lie between actual input image pixel locations. Consequently, a conventional interpolation method, e.g., bilinear interpolation of neighboring pixel values in the input image, produces the output pixel value for the given pixel location in the output image. Importantly, using an inverse transformation, the output image can be created in raster scan order.

Specifically, Equation 7 is a representation of an inverse transformation in accordance with the present invention. Each matrix in Equation 7 is the inverse of each matrix in Equation 6.

$$(u, v) = \left[ \left[ [(x, y)] \begin{vmatrix} 1 & -\tan \theta \\ 0 & 1 \end{vmatrix} \right] \begin{vmatrix} \frac{1}{S_h \cos \theta} & 0 \\ \sin \theta \cos \theta & 1 \end{vmatrix} \right] \begin{vmatrix} 1 & 0 \\ 0 & \frac{1}{S_v \cos \theta} \end{vmatrix} \quad (7)$$

$$\text{MATRIX 1} \qquad \text{MATRIX 2} \qquad \text{MATRIX 3}$$

where:

θ is an angle of image rotation;

$S_h$ is a horizontal scale factor; and $S_v$ is a vertical scale factor.

FIG. 4 depicts a flow chart of an inverse transformation routine 400. Routine 400 is entered upon execution at step 402, generally labeled "START". Thereafter, at step 404, an input image, or a portion thereof, is recalled from memory. At step 406, a pixel coordinate (x,y) in the output image is selected. Typically, the output pixels are selected in a raster scan order. At step 408, a user selects the parameters $S_h$, $S_v$, and τη defining the degree of scaling and rotating to be accomplished. At step 410, the output image pixel coordinates are multiplied by a matrix (MATRIX I in Equation 7) that applies a vertical shearing function to the coordinates. Next, at step 412, the vertically sheared pixel coordinates are multiplied by a second matrix (MATRIX 2 in Equation 7) to horizontally shear and horizontally scale the location. At step 414, the pixel coordinates resulting from step 412 are multiplied by a third matrix (MATRIX 3 in Equation 7) to vertically scale the pixel coordinates. At step 416, neighboring pixel locations, e.g., four locations, in the input image nearest the pixel location computed in step 414 are determined. From these four pixel locations and their respective pixel values, the routine 400 performs, at step 418, a conventional interpolation, e.g., bilinear interpolation, to compute the value of the output pixel at location (u,v). The pixel value at location (u,v) is then stored in memory. The inverse transformation routine ends at step 422.

Alternatively, the pixel value can be computed using interpolation at each step of routine 400. Specifically, after step 410 determines the vertically sheared pixel coordinates, the method computes a vertically sheared pixel value using interpolation of the neighboring pixel values in the input image. Further, after steps 412 and 414, the pixel values are also interpolated. The three interpolated pixel values are combined to determine the pixel value for the output image at coordinates (u,v).

As a result of routine 400 operating upon the input image, the image is scaled and rotated a predefined amount to location (x,y) in the output image. If routine 400 is repeatedly executed by selecting the pixel locations in the output image in raster scan order, the entire input image becomes scaled and rotated.

As with the forward transformation, the inverse transformation can also be accomplished using a vertical shear function, then a horizontal scale and shear function, and, lastly, a vertical scale function. As such, the inverse transformation can be generalized to first shear the input image along a first axis to produce a sheared image, then shear and scale the sheared image along a second axis to produce a scaled image, and, lastly, the scaled image is scaled along the first axis to produce an output image. The output image is a scaled and rotated version of the input image. In this general description, the first and second axes are orthogonal axes within a two-dimensional plane.

Although one embodiment incorporating the teachings of the present invention has been shown and described in detail herein, those skilled in the art can readily devise many other varied embodiments that still incorporate these teachings. The apparatus and method disclosed find applicability in video servers, medical imaging, special effects and animation and location based entertainment systems among other applications.

What is claimed is:

1. Apparatus for scaling and rotating an input image, comprising:

means for producing said input image;

means for defining an angle of rotation and an amount of scaling to be applied to said input image to produce an output image;

means for shearing said input image along a first axis to produce a first image;

means for shearing and scaling said first image along a second axis to produce a second image;

means for scaling said second image along said first axis to produce a third image as said output image that is a rotated and scaled version of the input image; and means for displaying said output image.

2. The apparatus of claim 1 wherein said first axis and second axes are orthogonal to one another and said first axis is horizontal and said second axis is vertical.

3. The apparatus of claim 1 wherein said first axis and second axis are orthogonal to one another and said first axis is vertical and said second axis is horizontal.

4. The apparatus of claim 1 wherein said input image further comprises a plurality of pixel values arranged in predefined locations defined by pixel coordinates within an input image coordinate system.

5. The apparatus of claim 4 further comprising means for individually selecting pixel coordinates in said input image to be rotated and scaled to form said output image.

6. Apparatus for scaling and rotating an input image to produce an output image, comprising:

means for producing said input image containing a plurality of pixel values arranged in predefined locations defined by input pixel coordinates within an input image coordinate system;

means for shearing an output pixel location along a first axis to produce a first pixel location;

means for shearing and scaling said first pixel location along a second axis to produce a second pixel location;

means for scaling said second pixel location along the first axis to produce a third pixel location, said third pixel location being rotated and scald from said output pixel location;

means for determining a pixel value for said third pixel location; and means for displaying said pixel value determined for said third pixel location at said output pixel location.

7. The apparatus of claim 6 wherein said first axis and second axes are orthogonal to one another and said first axis is horizontal and said second axis is vertical.

8. The apparatus of claim 6 wherein said first axis and second axis are orthogonal to one another and said first axis is vertical and said second axis is horizontal.

9. The apparatus of claim 6 further comprising means for defining the angle of rotation and the amount of scaling to be applied to said input image to produce said output image.

10. The apparatus of claim 6 wherein said means for determining said pixel value further comprises:

means for selecting a plurality of pixel values in said input image neighboring said third pixel location; and means for calculating said pixel value determined for said third oixel location by interpolation of said selected plurality of input image pixel values.

11. A method for scaling and rotating an input image, comprising the steps of:

producing said input image;

defining an angle of rotation and an amount of scaling to be applied to said input image to produce an output image;

shearing said input image along a first axis to produce a first image;

shearing and scaling said first image along a second axis to produce a second image;

scaling said second image along the first axis to produce a third image that is a scaled and rotated version of said input image; and displaying said third image as said output image.

12. The method of claim 11 wherein said first axis and second axes are orthogonal to one another and said first axis is horizontal and said second axis is vertical.

13. The method of claim 12 wherein said first axis and second axis are orthogonal to one another and said first axis is vertical and said second axis is horizontal.

14. The method of claim 11 wherein said input image further comprises a plurality of pixel values arranged in predefined locations defined by pixel coordinates within an input image coordinate system.

15. The method of claim 14 further comprising the step of individually selecting pixel coordinates in said input image to be rotated and scaled to form said output image.

16. A method for scaling and rotating an input image to produce an output image, comprising the steps of:

producing said input image containing a plurality of pixel values arranged in predefined locations defined by input pixel coordinates within an input image coordinate system;

shearing an output pixel location along a first axis to produce a first pixel location;

shearing and scaling said first pixel location along a second axis to produce a second pixel location;

scaling said second pixel location along the first axis to produce a third pixel location that is rotated and scaled relatiye to said output pixel location;

determining a pixel value for said third pixel location; and displaying said pixel value determined for said third pixel location at said output pixel location as an output pixel value.

17. The method of claim 16 wherein said first axis and second axes are orthogonal to one another and said first axis is horizontal and said second axis is vertical.

18. The method of claim 16 wherein said first axis and second axis are orthogonal to one another and said first axis is vertical and said second axis is horizontal.

19. The method of claim 16 further comprising the step of defining the angle of rotation and the amount of scaling to be applied to said input image to produce said output image.

20. The method of claim 16 wherein said step of determining said output pixel value further comprises the steps of:

selecting a plurality of pixel values in said input image neighboring said third pixel location; and calculating said output pixel value by interpolation of said selected plurality of input image pixel values.

21. The method of claim 16 further comprising the step of repeating the steps of the method until all of the pixel locations in said output image have pixel values.

* * * * *